INVENTOR.
D. E. PERRY

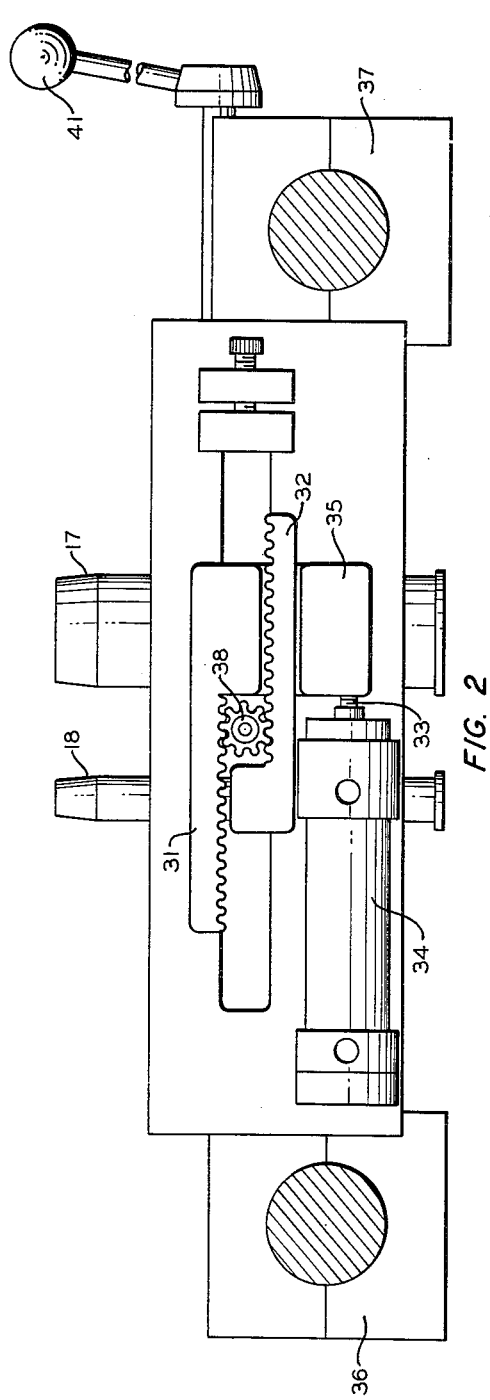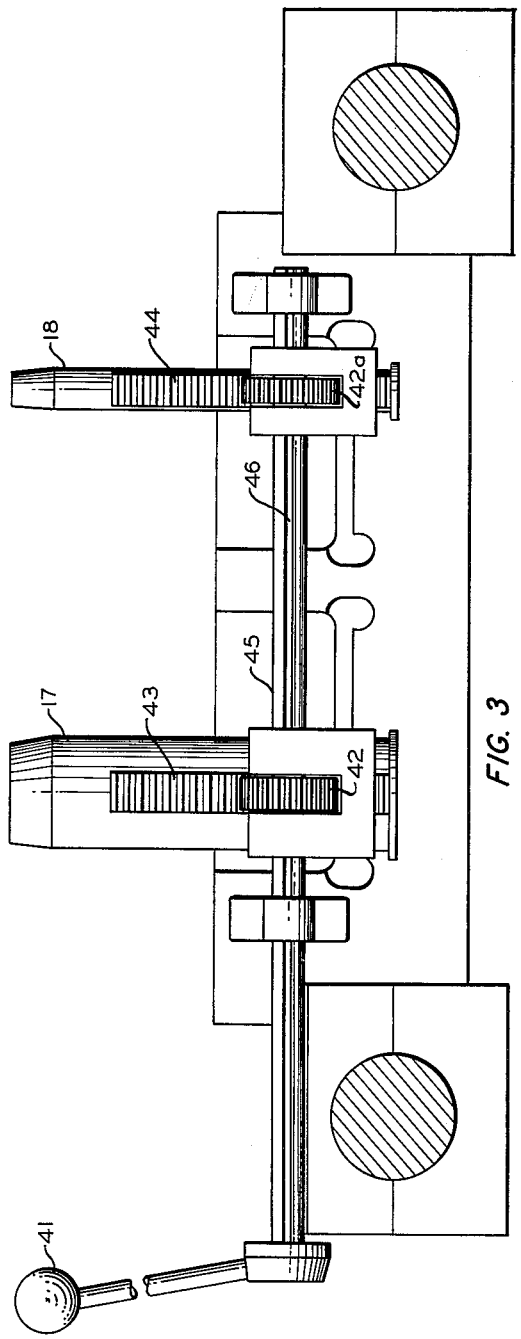

United States Patent Office 3,100,317
Patented Aug. 13, 1963

3,100,317
METHOD AND APPARATUS FOR MOLDING
HOLLOW PLASTIC ARTICLES
Dan E. Perry, Bartlesville, Okla., assignor to Phillips
Petroleum Company, a corporation of Delaware
Filed Jan. 22, 1962, Ser. No. 167,684
6 Claims. (Cl. 18—5)

This invention relates to a method and apparatus for forming large molded articles. More particularly this invention relates to a method and apparatus for molding large articles which have a plurality of openings in same. In one aspect the invention relates to a method for forming large molded articles by providing a means to properly position and shape the parison used for same. In another aspect the invention relates to a method for forming a plurality of openings in a large object being molded by providing a core means which is so adapted as to position and shape the desired openings. A still further aspect relates to providing an improved apparatus for molding large objects such as drums which have bung openings in same by providing in the molding means movable cores which will position the parison and shape the desired openings in same.

The process known as blow molding by which hollow objects are produced by extruding a quantity of moldable material into a hollow mold and then inflating the material against the mold surface where it freezes into shape is a very useful one in the plastic molding industry. However, in the past such a process has been limited to comparatively small items since a variety of problems arises as the size of the item desired is increased. For example, the heat content of the plastic material must be controlled so as to maintain same in a moldable state. Also where large quantities of plastic material are vertically molded, the parison has a tendency to become non-uniform due to the total weight of the parison supported from the mandrel. Also, the parison tends to settle and thus thicken at the lower end of same. This causes a difficult problem when attempting to form a large uniform-walled object. Also when it is desirable to place outlets in the larger objects, positioning of the outlets in same creates a distinct problem generally due to the difference in the parison size and the required location of the outlets. Another problem in blow molding large articles is that of the parison being cut off prematurely so that the parison falls within the mold prior to completion of the blowing cycle.

By the present invention I have now found a method and apparatus to overcome these difficulties heretofore experienced in the formation of such large molded articles.

Thus it is an object of this invention to provide a method for forming large molded articles.

Another object of this invention is to provide a method for placing bung openings into molded articles.

Another object of this invention is to provide apparatus which is capable of positioning the parison and forming desired bung openings in large molded objects.

Other aspects, objects and the several advantages of this invention will be apparent from a study of the disclosure, the appended claims and the drawings, of which:

FIGURE 2 is a view of the bung opening formers in a closed position;

FIGURE 3 is a view of the bung opening formers in a raised and open position.

The apparatus by which the articles are formed will be described in conjunction with a description of the steps in the formation of the plastic article.

Figure 1:
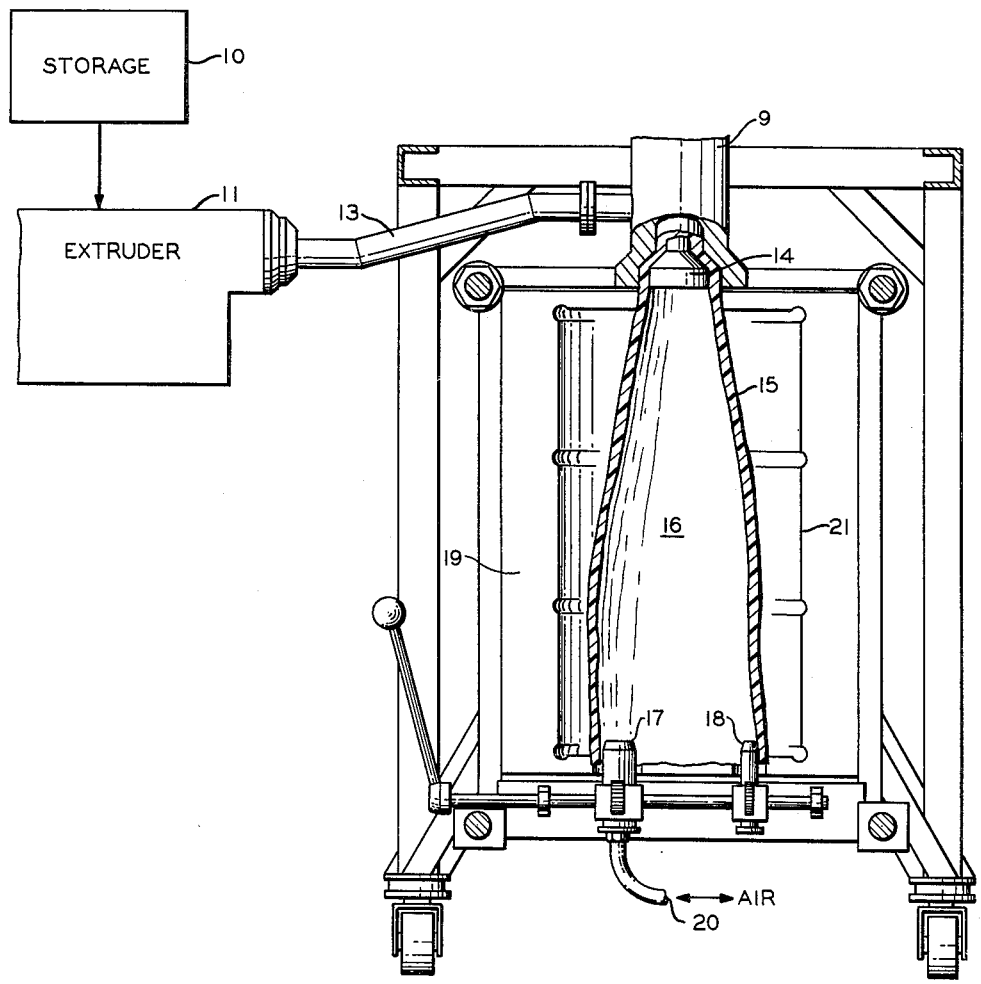
FIGURE 1 is an elevational view of the apparatus of this invention with a cutaway showing a cross section of the parison in the first stages of the blowing operation.

As illustrated in FIGURE 1 plastic material is delivered from storage zone 10 to extruder 11 wherein it is reduced to a molten state. From extruder 11 the molten plastic material is passed through conduit 13 to die head 9 and mandrel 14 to form a tubular parison 15. Conduit 13 and die head 9 are normally insulated or equipped with auxiliary heaters to prevent any hardening of the melt passing therethough. This parison then descends the length of the molding zone 16. At the time the parison begins to descend, bung formers 17 and 18 are raised upward in such a manner as to fit on the interior of the parison 15 and the mold 19. Since the parison 15 as extruded is of smaller internal diameter than the bung hole's center distance, the bung hole formers 17 and 18 are positioned together as shown in FIGURE 2, the parison 15 permitted to descend over them, and the formers then moved horizontally to molding position. This serves to stretch the parison so as to place the bung hole cores in proper position for molding. As soon as the parison is stretched to molding position, mold 19 composed of two identical halves closes and simultaneously closes the upper and lower ends of the parison.

As soon as the article-forming mold 19 is closed, air is injected under pressure into the interior of the parison 15 through conduit 20 placed within core member 17. Air under pressure is provided to the interior of the mold and parison through conduit 20. The parison 15, which is in a softened condition, is blown outwardly to assume the shape of the cavity of the article-forming mold.

As soon as the parison has been blown to conform with the shape of the mold and sufficiently cooled so as to be rigid, the pressure is released from within the mold and the mold is opened.

The raised cores 17 and 18 are then lowered from the end of the resulting blown item having the configuration of mold 21 leaving the molded article with the desired outlet holes properly spaced.

As shown in FIGURE 2 core members 17 and 18 supported by structure 36 and 37 are in a closed position. These members are adapted to travel in a horizontal direction by actuating piston 33 which in turn causes the racks 31 and 32 to move outwardly in opposite directions. Pinion 38 is actuated by hydraulic cylinder 34 which can be operated by any conventional means, mechanical or electrical or the like.

Since the parison is smaller in diameter than the bung opening's center distance, it is necessary to move the cores 17 and 18 toward the center and raise same to a vertical position so as to allow the parison to drop over them. Piston 33 pushes connector 35 of rack 31 simultaneously causing former 17 to move outwardly and pinion 38 to rotate and move rack 32 and connected former 18 in the opposite direction.

FIGURE 3 is taken from the opposite side of core members 17 and 18 as shown in FIGURE 2. The core members are raised by means of handle 41 which in turn serves to rotate pinions 42 and 42a which move the cores upward along racks 43 and 44. Pinions 42 and 42a are fastened to shaft 45 by keys, not shown, which slide in keyway 46. Upon completion of the molding operation handle 41 is rotated in the opposite direction and the cores 17 and 18 traveling on racks 43 and 44 are lowered so as to allow for removal of the molded object upon opening the mold halves.

Figure 4:
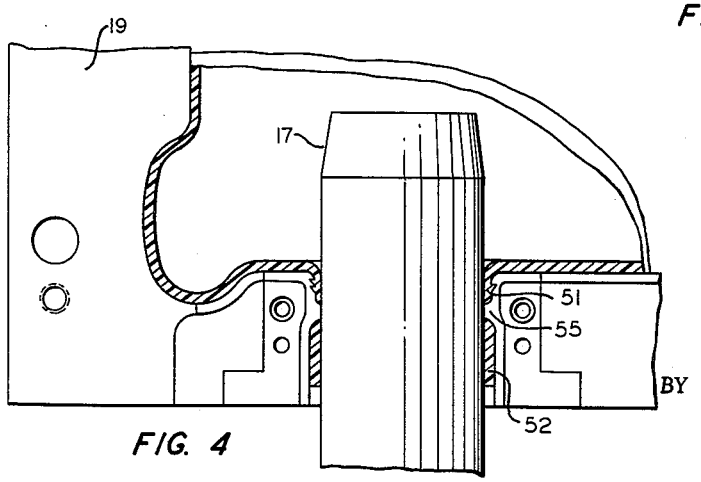
FIGURE 4 is a view of a portion of the molded parison with the bung former in its elevated position within the mold.

During molding, as shown in FIGURE 4, the core 17 which is raised, fits into area 51 of the mold 19. Parison 15 is shaped around core 17 due to the action of the mold halves coming together and any excess of the parison, such as 52, is cut off by the action of the mold edge 55 against the core member. When lowered from the mold the area previously occupied by the core member is then a suitable bung opening.

Air to the interior of the mold housing 19 and parison 15 is introduced by means of the opening in core 17. If desired, the fluid utilized for blowing the parison can be introduced through the extrusion means rather than the core member. However, introduction of blowing fluid through the core member is preferred since it avoids the necessity of extra tubing having to be placed in the extrusion mandrel.

The time of raising or lowering the cores requires only that they be in elevated position in time to receive the parison and lowered only after the completed object is formed and sufficiently cooled so as to prevent loss of shape when the mold halves are opened. Any suitable means may be utilized to raise and lower the cores.

The horizontal extension of the cores must be made rapidly to eliminate sagging of the parison. This can be achieved by hydraulic means such as shown in FIGURE 2. However, other extension means can be used.

The electrical and hydraulic connections for controlling the cycle of operation are not illustrated as they are well known in this field and do not in themselves form part of the present invention. The amount of heat which is required to be supplied depends to a considerable extent upon the rapidity with which the operation takes place and the size and shape of the articles being molded.

The plastic materials which can be utilized within the concept of this invention can be any plastic such as polymers of monoolefins which are generally used in extrusion operations and particularly polyethylene which is produced in accordance with the process of Hogan and Banks as disclosed in U.S. 2,825,721, issued March 4, 1958.

Reasonable variations and modifications are possible within the scope of the foregoing disclosure, drawings and the appended claims to the invention, the essence of which is that there has been provided a method and apparatus for forming openings in a large blown article which comprises raising an opening forming means into a position below a parison extrusion means, extruding down over the opening forming means a parison, moving the cores horizontally to the desired mold position and thereby stretching the parison, closing the molding means around the thus stretched parison so as to seal the parison at both the upper and lower ends, blowing said parison into conformity with said molding means, cooling the thus formed blown parison, retracting the opening means from the mold means and subsequently removing the blown article therefrom.

I claim:

1. A method for forming hollow plastic articles having a multiplicity of openings therein which comprises downwardly extruding a tubular body into the confines of an open mold, raising and horizontally extending within said tubular body first and second core members so as to extend said tubular body at its lower end, closing the mold around said extended tubular body and core members, thereby closing both upper and lower ends of the tubular body and forming its lower end around said core members, blowing the tubular body to the shape of the mold, cooling the blown article, opening the mold and removing the cooled formed article from same.

2. The method of claim 1 wherein the tubular body is blown into the shape of the mold by fluid introduced through one of said core members.

3. The method of claim 2 wherein the tubular body is blown into the shape of the mold by fluid introduced through the tubular body forming means.

4. Apparatus for forming hollow plastic articles having a plurality of openings in same comprising, in combination, parison extrusion means, an article mold formed of two separable halves, means for moving said two article mold halves together into a closed position in face-to-face engagement, opening forming means having a plurality of core members, gear means to move said core members so as to raise and lower same, means to actuate said gear means, means to move said core members horizontally so as to position same in said mold at a point where said openings are to be formed, and blowing means to introduce blowing pressure into the parison.

5. The apparatus of claim 4 wherein said means to move said cores in a horizontal direction comprises a first and second rack means attached to said core members and being adapted to move in opposite directions, connecting means adapted to one of said core members, piston means adapted to said connecting means so as to move said core member and means to actuate said piston means.

6. Apparatus according to claim 4 wherein said opening forming means has incorporated therein said blowing means for introducing blowing pressure into the parison.

References Cited in the file of this patent

UNITED STATES PATENTS

| 2,787,023 | Hagen et al. | Apr. 2, 1957 |
| 2,918,698 | Hagen et al. | Dec. 29, 1957 |

FOREIGN PATENTS

| 1,029,586 | France | June 3, 1953 |
| 789,816 | Great Britain | Jan. 29, 1958 |